(12) United States Patent
Donovan

(10) Patent No.: US 6,366,577 B1
(45) Date of Patent: *Apr. 2, 2002

(54) METHOD FOR PROVIDING IP TELEPHONY WITH QOS USING END-TO-END RSVP SIGNALING

(75) Inventor: Steven R. Donovan, Plano, TX (US)

(73) Assignee: MCI WorldCom, Inc., Jackson, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/586,203

(22) Filed: Jun. 2, 2000

Related U.S. Application Data

(63) Continuation-in-part of application No. 09/436,794, filed on Nov. 8, 1999.
(60) Provisional application No. 60/163,193, filed on Nov. 2, 1999.

(51) Int. Cl.[7] .......................... H04L 12/66; H04L 12/28
(52) U.S. Cl. ...................... 370/352; 370/236; 370/351; 379/900; 709/226; 709/227; 709/230; 709/237; 709/238
(58) Field of Search ................................. 370/352, 354, 370/356, 389, 401, 912; 379/90.01, 900; 709/220, 223, 226, 227, 230, 238, 245, 249

(56) References Cited

U.S. PATENT DOCUMENTS

| | | | | |
|---|---|---|---|---|
| 6,058,113 A | * | 5/2000 | Chang | 370/390 |
| 6,141,686 A | * | 10/2000 | Jackowski et al. | 709/224 |
| 6,157,648 A | * | 12/2000 | Voit et al. | 370/401 |

OTHER PUBLICATIONS

White, Paul P. "RVSP and Integrated Services in the Internet: A Tutorial." May 1997. IEEE Communications Magazine.*

Schulzrinne, H., Rosenberg, J., and Lennox, J. "Interaction of Call Setup and Resource Reservation Protocols in Internet Telephony." Jun. 15, 1999. Technical Report.*

Schulzrinne, H. and Rosenberg, J. "Signaling for Internet Telephony." Feb. 2, 1998. Columbia University, Dept. of Computer Science Technical Report CUCS–005–98.*

Braun, Torsten. "Internet Protocols for Multimedia Communications." Oct. 1997. IEEE Multimedia.*

Braden, R., Zhang, L., Berson, S., Herzog, S., and Jamin, S. "Resource Reservation Protocol (RSVP)—version 1 Functional Specification." Sep. 1997. Network Working Group RFC 2205.*

(List continued on next page.)

*Primary Examiner*—Hassan Kizou
*Assistant Examiner*—Joe Logsdon

(57) ABSTRACT

The present invention discloses a method whereby the separate protocols: session initiation protocol SIP, resource reservation protocol RSVP, common open policy service COPS, and open settlement protocol OSP are used together to setup, maintain, and teardown Internet communications having an acceptable QoS. This process is accomplished by dynamically establishing RSVP policy based on SIP telephony requests to provide IP communications with QoS across the Internet. The QoS policy is installed in network elements at the request of the network elements. The network elements receive a RSVP PATH or RESV request and queries the policy server; the policy server queries a Local database about ID and services for the user and a clearinghouse server (if available) or a policy server in a corresponding network; upon positive acknowledgment from the local database and/or the clearinghouse server, the policy server confirms policy in network elements to accept RSVP PATH and RESV requests for the particular reserved data flow to the SIP client. In this manner, the called telephone will not ring until policy has been provisioned in the network elements and resources have been reserved end-to-end to ensure an acceptable level of QoS.

9 Claims, 15 Drawing Sheets

OTHER PUBLICATIONS

Sinnreich, H., Donovan, S., Rawlins, D., and Thomas, S. "Interdomain IP Communications with QoS, Authentication and Usage Reporting." Feb. 2000. Internet Draft.*

Sinnreich, H., Rawlins, D., Johnston, A., and Thomas, S. "AAA Usage for IP Telephony with QoS." Mar. 3, 2000. http://www.fys.ruu.nl/~wwwfi/aaaarch/pittsburg/sinnreich/sld001.htm.*

Eriksson, M. and Lundstedt, L. "SIP Telephony Gateway on DTM." Jul. 2, 1999. Bachelor's Thesis, Royal Institute of Technology, Sweden.*

Sinnreich et al. "AAA Usage for IP Telephony with QoS." IETF Internet Draft. Jul. 2000.*

Schulzrinre, H. "A comprehensive multimedia control architecture for the Internet." 1997 IEEE.*

Barzilai, T., Kandlur, D., Mehra, A., Saha, D., and Wise, S. "Design and Implementation of an RSVP–based Quality of Service Architecture for Integrated Services Internet." 1997 IEEE.*

* cited by examiner

METHOD FOR PROVIDING IP TELEPHONY WITH QOS USING END-TO-END RSVP SIGNALING

CROSS-REFERENCE TO RELATED APPLICATIONS

This application is a continuation-in-part of the U.S. application having Ser. No. 09/436,794 filed on Nov. 8, 1999.

This application claims benefit under 35 U.S.C. §119(e) of U.S. Provisional application Ser. No. 60/163,193, filed Nov. 2, 1999.

BACKGROUND OF THE INVENTION

1. Field of the Invention

The present invention relates generally to the field of IP communication, and more particularly to a method for providing Internet Protocol (IP) telephony with quality of service (QoS) using end-to-end Resource Reservation Protocol (RSVP) signaling.

2. Discussion of the Related Art

The Internet community is working toward one day having all forms of inter-personal communication carried over the Internet. Video broadcasts, radio transmissions, computer data and telephone systems will merge into one medium and be transported anywhere in the world without any loss of perceived quality.

In order to be commercially practicable however, IP communications such as IP telephony and other IP communication services will require a quality of service (QoS) equal to or better than that currently available on digital circuit switched networks. This requires end-to-end QoS in corporate IP networks and across the IP backbones that carry traffic between the end networks. While QoS is available, it requires the usage of network resources and therefore, service providers will only ensure QoS if authorization and payments are supported across the domains where the communications are taking place.

Several protocols and services have been developed to handle the various aspects of IP communications. For instance, Session Initiation Protocol (SIP) was developed for call setup; Open Settlement Protocol (OSP) was developed for authorization and usage reporting and is used between policy servers and a clearing house for pricing, usage exchange and settlements for services; Common Outsourcing Policy Service (COPS) was developed for policy deployment in network elements and is used between the policy server and other network elements to communicate policy applicable for microflows that have QoS support; Resource Reservation Protocol (RSVP) was developed for setting up QoS in end networks and refers to a signaling protocol to request QoS from the network. RSVP is an end-to-end signaling protocol and can be used between corresponding telephony clients in the respective domains; Subnet Bandwidth Manager (SBM) was developed for setting up RSVP initiated QoS in 802.x style LANs; and Differentiated Services (DiffServ) was developed for setting up QoS traffic classes in IP backbones.

In order to complete a phone call on the Internet, at least three things should occur. First, the called party has to be alerted. Second, the connection between the callers must be established, and finally, resources to connect to callers may have to be set aside exclusively for the conversation. These steps do not have to occur in this order however. To this end, SIP is responsible for establishing the session while RSVP is responsible for reserving the resources necessary for a call.

Providing IP communications with QoS across the Internet requires a common way of usage for call setup, authorization, and QoS. Though the individual protocols above have been developed in detail, there is currently no reported method on how to use the individual protocols together in a consistent way across the Internet. In addition, there are no reported methods for dynamically establishing QoS policy for SIP-based voice and video calls on the Internet.

SUMMARY OF THE INVENTION

It is therefore an object of the present invention to provide a method for implementing IP telephony with QoS using end-to-end RSVP signaling that is capable of providing an acceptable QoS during a IP communications across the Internet.

It is another object of the invention to provide a method for dynamically establishing QoS policy for SIP-based voice and video calls on the Internet.

It is an additional object of the invention to provide a method for implementing IP telephony with QoS using end-to-end RSVP signaling that is efficient in its use of network resources and easy to implement.

To achieve these objects, there is provided a method for implementing IP telephony with QoS using end-to-end RSVP signaling that comprises the transfer of a unique sequence of messages prior to, during, and after IP communications. The sequence is not arbitrary as the parameters communicated in a previous message may be used in the follow-up messages. While the message exchanges for the protocols listed above are well documented and understood when each is used in isolation, this is not the case when they are used together.

The present invention discloses a method whereby the separate protocols are used together to setup, maintain, and teardown Internet communications having an acceptable level of QoS. This is accomplished by dynamically establishing RSVP policy based on SIP telephony requests. The application defines two options for QoS support for IP telephony: PSTN-style "QoS assured" where QoS is guaranteed, and Internet-style "QoS enabled" where only partial or no QoS may be available. In addition, the application deploys QoS in two ways: 1) "Pull" method, QoS is outsourced to the servers or 2) "Push" method, QoS is provided locally to the routers.

The method of providing quality of service (QoS) in an Internet Protocol (IP) telephony session between a calling party and a called party, comprises the steps of providing transporting IP media for the session between said calling party and a first device having IP capability; providing transporting IP media for the session between the called party and a second device having IP capability; establishing an IP connection between said first device and the second device; and reserving network resources for the telephony session.

Although the embodiments of the present invention focus more on the "pull" method, the present invention employs both methods.

While the present invention focuses on the use of RSVP for end-to-end signaling of QoS reservations, the concepts can also be extended for use with any end-to-end reservation protocol. In addition, the same concept also applies to dynamically establishing DiffServ policy based on SIP telephony requests wherein the policy is provisioned on a real time basis to the router (PUSH) instead of the router querying for the policy on a real time basis (PULL.)

BRIEF DESCRIPTION OF THE DRAWINGS

These and other objects and features of the present invention will become apparent from the following detailed description considered in connection with the accompanying drawings in which.

DETAILED DESCRIPTION OF PREFERRED EMBODIMENTS

The application defines two options for QoS support for IP telephony: PSTN-style "QoS assured" where QoS is guaranteed, and Internet-style "QoS enabled" where only partial or no QoS may be available. In addition, the application deploys QoS in two ways: 1) QoS is outsourced to servers "Pull" method, or 2) QoS is provided locally "Push" method.

The method of providing quality of service (QoS) in an Internet Protocol (IP) telephony session between a calling party and a called party, comprises the steps of providing transporting IP media for the session between said calling party and a first device having IP capability; providing transporting IP media for the session between the called party and a second device having IP capability; establishing an IP connection between said first device and the second device; and reserving network resources for the telephony session.

The term "policy" refers to a combination of rules defining criteria for network resource access and usage, while the term QoS assured refers to the situation when the telephone call will complete only after all the network resources required for a specified QoS level are assured by such means as a successful RSVP reservation from end-to-end. QoS enabled refers to the situation when only partial or no QoS may be available due to the inability to guarantee end-to-end quality of service or temporarily high network traffic.

The "Pull" Model refers to the situation when network elements initiate a COPS query to the policy server. For example, the network element receives a RSVP PATH or RESV request and queries the policy server; the policy server queries a Local database about ID and services for the user and a clearinghouse server (if available) or a policy server in a corresponding network; upon positive acknowledgment from the local database and/or the clearinghouse server, the policy server confirms policy in network elements to accept RSVP PATH and RESV requests for the particular reserved data flow to the SIP client. In this manner, the called telephone will not ring until policy has been provisioned in the network elements and resources have been reserved end-to-end to ensure an acceptable level of QoS.

Figure 1:
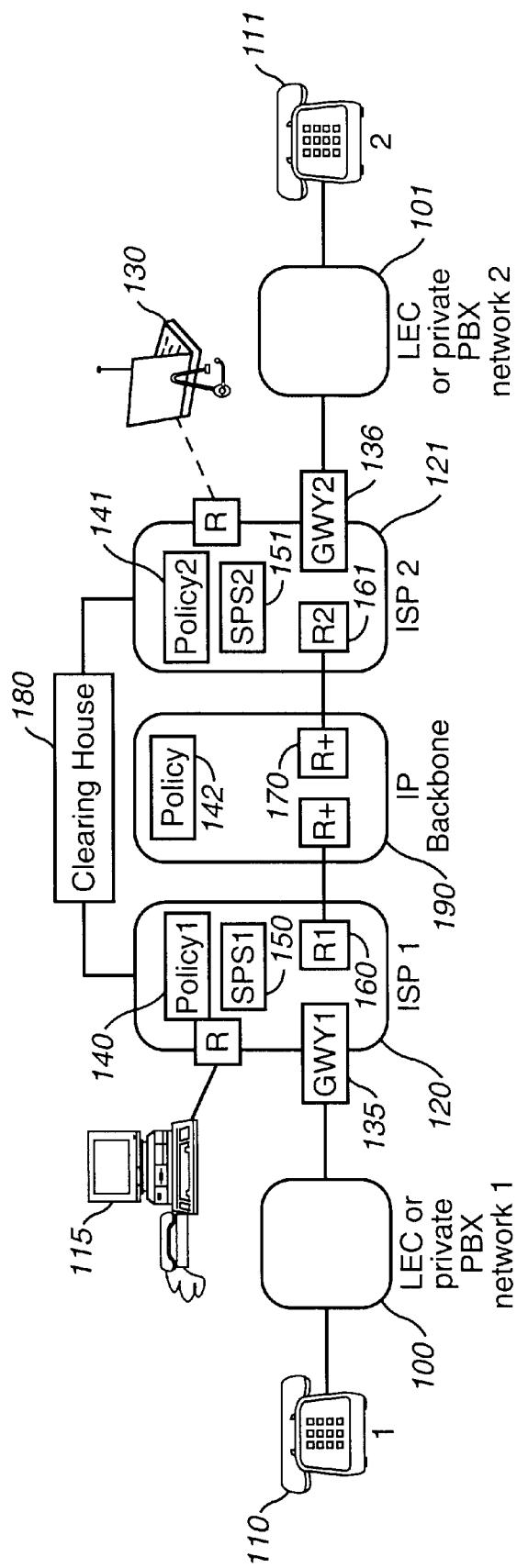
FIG. 1 is a schematic view of a reference model for IP telephony communication.

Referring now to the drawings, in which similar reference characters denote similar or identical elements throughout the several views, FIG. 1 shows a schematic diagram of a reference model for IP communication of the telephony type. The reference model has been chosen to represent many instances found in IP telephony or other types of IP communications. It is not, however, an exhaustive model, but rather serves the purpose of defining the message exchange between networks and network elements.

The reference model of FIG. 1 has two types of clients: 1) at least one analog or digital phone 110, 111 that connects to the IP network via a circuit switched network 100, 101 (PBX) and IP telephony gateways (GWY) 135, 136; and 2) at least one IP client such as an IP phone 115 or various types of computers 130. Here, IP telephony gateways 135, 136, IP phones 115 and computers 130 are considered clients for SIP call setup and RSVP signaling for network resources.

Internet Service Providers (ISPs) 120, 121 provide access to an IP backbone 190 while the local exchange carrier (LEC) for circuit switched telephony and the private branch exchange (PBX) provide access to the ISPs 100, 101. The physical connections between the ISPs, PBX's, and the IP telephony gateways can be any suitable media. In general, most of the Internet traffic travels over fiber optic cable, coax cable and twisted pair wire.

The ISPs may also be referred to as an Access Network, i.e. an IP network to which users connect directly to their hosts/clients for IP communications or various servers for such communications. The access network is part of a single administrative domain, such as Internet Service Providers (ISPs), corporate networks, government and educational organizations.

The IP backbone may also be referred to as a Transit Network, and there may be one or several transit networks in between two or more access networks. Since transit networks are sometimes referred to as backbone networks, the distinctions between them are somewhat fuzzy since a transit network may also act as an access network. For the model used here, a transit network has no directly connected hosts for the particular session, be it telephony or any other type. A transit network in the present model has no knowledge of individual microflows of data, such as phone calls between parties connected to adjacent access networks.

Policy servers 140, 141, and 142 (1) authorize internal QoS for microflows (2) may communicate for telephony purposes with an outside clearinghouse or (3) communicate directly with an outside policy server in the correspondent administrative domain. In addition, the policy servers use COPS for policy deployment in their respective elements. COPS is a query and response protocol that can be used to exchange policy information between a policy server and its clients. In addition, COPS RSVP capable edge routers R1 and R2, 160 and 161, are similarly situated in their respective networks to route network traffic. The edge routers act as gates for QoS support for clients requesting service. In addition, the edge routers perform the following functions: 1) Acts as policy enforcement point (PEP) under control of the policy server to accept or reject RSVP requests for clients; 2) Provides traffic shaping, i.e. delays packets within various traffic streams so as to enforce the service level specification SLS. The edge routers R1 160 and R2 161 communicate with border routers 170, 171. The border routers protect the transit network against theft of service and of possible denial of service attacks by border routers facing edge routers in the adjacent access network. Traffic between edge routers and border routers is protected by the physical security of the data link. The border router polices the ingress traffic from the edge router in the access network.

SIP proxy servers (SPS) 150, 151 act as policy enforcement points (PEP) to authorize calls requested by SIP clients 110, 111, 115 and 130. The SIP proxy server acts on the behalf of and provides services to all clients in the access network or the administrative domain. Clients requesting call setup have to be first registered with the SIP server before obtaining authorization for QoS supported calls. After registration with the SIP server, the server may handle all call requests to/from that client. This does not exclude however direct client-client call setup without the benefits of any SIP server. Such direct client-client call setups can be faster and may be desirable for special services, such as the equivalent of the hot line. Clients that are not registered and authorized for direct calling cannot have the QoS benefit via the support from the SIP and policy servers.

A Service Level Specification (SLS) (not shown) refers to a machine readable agreement between the access network provider and transit network provider with regard to QoS and other features. Present SLSs are of static nature, though there is interest in signaling for dynamic delivery of QoS between service providers, such as in the case of bandwidth broker services. A Clearing House server (CH) 180 serves several functions pertinent to call setup with QoS. In particular, clearing house server 180 acts as a trust broker between a large number of network providers, an optional gateway location service for IP telephony, an authorization for QoS (similar to credit card authorization in commerce), a collector of usage reports, and as a means of settlement between service providers. Given the large number of access networks belonging to different administrative domains, it is not possible to have SLS between all domains on the Internet. Clearinghouses facilitate the authorization and logging or accounting between domains for premium services, such as QoS. This does not preclude however some domains from having direct bilateral agreements so as not to use any clearinghouse service when exchanging traffic. The protocols used in this draft apply equally well for the case of using clearinghouses or for bilateral agreements. We will use the examples with clearinghouses, since they render a more complete image.

All of the above network elements operate together to setup, maintain and close a telephone conversation on the Internet Each network element responds to a unique set of messages and commands.

While the message exchanges for the protocols listed above are well documented and understood separately, when used together with all of the network elements, this is not the case.

Figure 2:
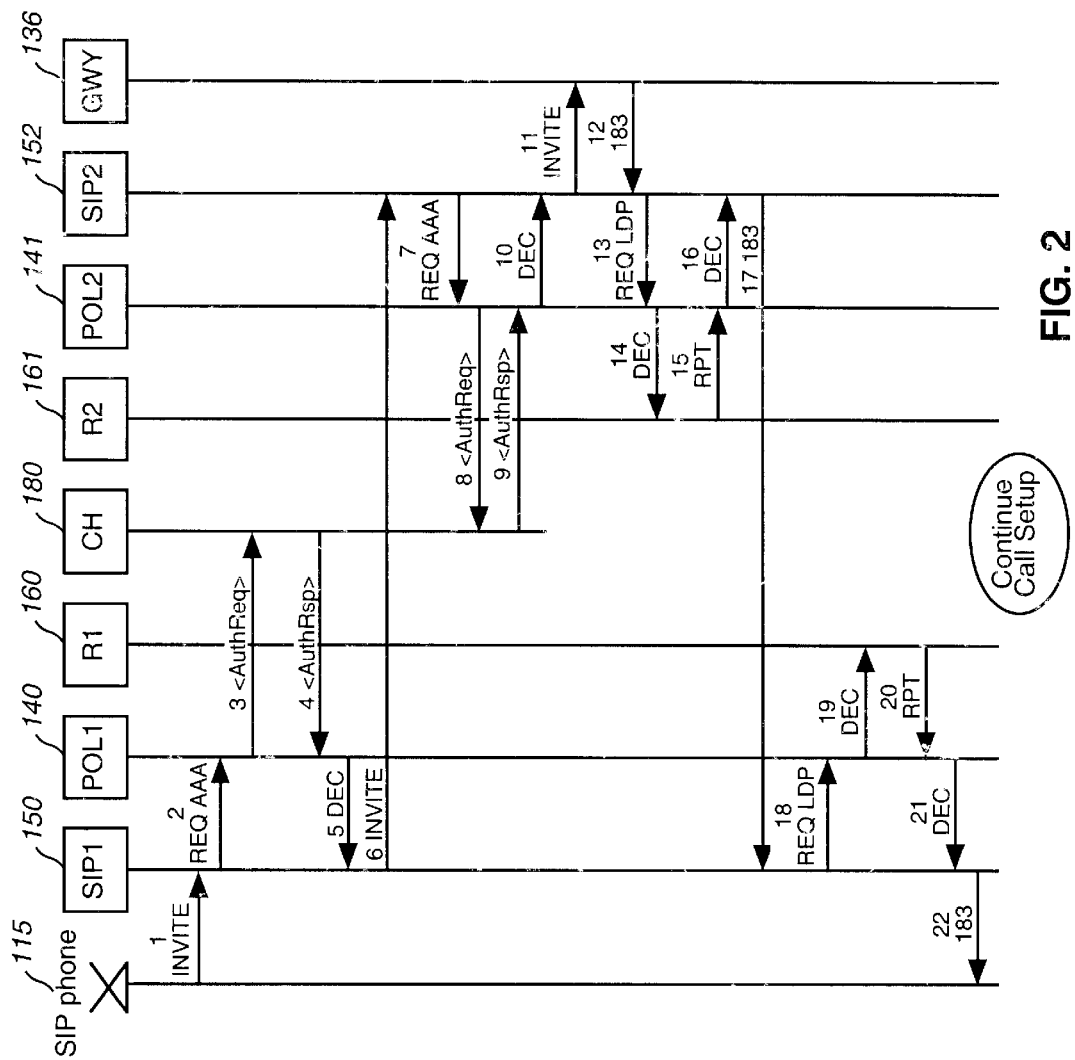
FIG. 2 is a call flow diagram illustrating a call setup request, authorization and policy installation in accordance with the present invention.

Referring to FIG. 2, there is shown a call flow diagram illustrating a call setup request, authorization and policy installation according to the present invention. In general, the call setup request, authorization and policy installation occur as follows:

a) a SIP client (phone) 115 requests call setup from a SIP1 proxy server 150;

b) SIP1 150 checks a local policy server POL1 140;

c) Local policy server POL1 140 checks with a clearing house server CH 180;

d) SIP1 150 requests call setup from a remote SIP2 152;

e) SIP2 151 checks a local policy server POL2 141;

f) Local policy server POL2 141 checks with clearing house server CH 180;

g) Remote policy server POL2 provisions policy for use by local policy control in edge router R2 161 and SIP2 152;

h) If OK, local SIP1 150 gets positive call progress report from remote SIP2 152;

i) Local policy is provisioned by POL1 140 in edge router R1 160 and proxy server SIP1 150; and 10) SIP1 150 informs phone 115 of call progress.

The actual sequence of messages belongs to several protocols: SIP, OSP, COPS, RSVP and SBM. The sequence is described in detail in FIG. 2.

SIP phone 115 initiates a session by sending an SIP INVITE message 1 to proxy server SIP1 150 and requests QoS. SIP1 150 then sends a COPS REQ AAA (authentication, authorization, and accounting) message 2 to local/client policy server POL1 140. Upon receipt of message 2, local policy server POL1 140 sends an OSP authorization request authentication request AUTHREQ message 3 to clearing house server CH 180. Clearing house server CH 180 responds by sending an OSP Authorization response AUTHRSP message 4 back to POL1 140. AUTHRSP message 4 includes an authorization token for use with call setup.

POL1 140 next sends a COPS DEC (decision) install message 5 to SIP1 150 with the authorization token embedded in the message. SIP1 150 requests call setup with remote SIP2 by generating an SIP INVITE message 6 requesting QoS and sending message 6 to SIP2 152. Upon receipt of INVITE message 6, SIP2 152 issues a COPS REQ AAA message 7 to policy server 2 POL2 141. Message 7 also contains the authorization token. Messages 8, 9 and 10 are identical to messages 3, 4, and 5 but performed at the remote end.

SIP2 152 then invites GWY 136 by sending an SIP INVITE message 11 that requests QoS. GWY 136 answers with an SIP 183 message 12 and echos that QoS is required. A SIP 183 message signifies session progress. SIP2 152 signals policy server POL2 using a COPS REQ LDP (local decision policy) request message 13. POL2 141 provisions policy for use by local policy control in edge router R2 161 and SIP2 152 by sending a COPS DEC install message 14 to R2 161 and receiving a COPS RPT (report) message 15 from R2 161 when the installation is successful. POL2 141 sends a COPS DEC install message 16 to SIP2 152 to install the policy in SIP2 151. When policy is provisioned in the remote end, SIP2 152 sends a SIP 183 message 17 to SIP1 150 which signifies a positive call progression on the remote end. Messages 18–21 are identical to messages 13–16 and provision policy in edge router R1 160 and SIP1 150. Finally, SIP1 150 informs SIP client phone 115 of the call progress by sending SIP 183 message 22.

At this point, SIP, OSP and COPS protocols are used to setup a call request, authorize the call and install policy for the call. There is however the possibility that the call, while setup successfully using SIP will experience less than acceptable quality due to resource limitations discovered after the call is set up. The present invention solves this problem by dynamically establishing QoS policy for SIP based voice and video calls on the Internet, as will be discussed below.

Figure 3:
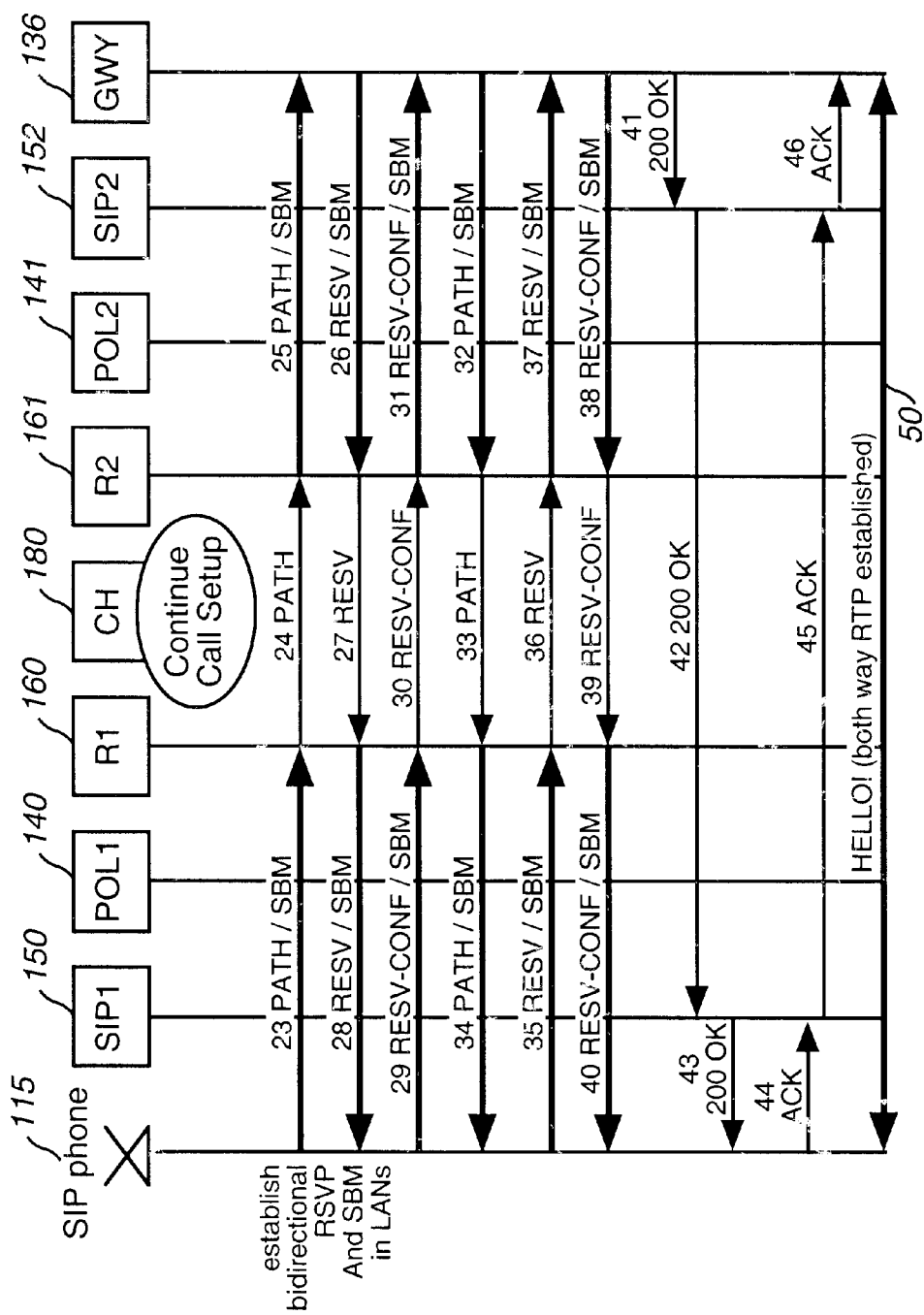
FIG. 3 is a call flow diagram illustrating a QoS setup and completion of the IP telephone call in accordance with the present invention.

Referring now to FIG. 3, there is shown a call flow diagram illustrating QoS setup, resource reservation and completion of the IP telephone call according to the present invention. In general, the QoS setup and completion of the IP telephone call occur as follows:

a) SIP client 115 requests network resources for QoS using RSVP. At the edge router, QoS for the flow is enforced per the local policy control. The specific policy for the flow was provisioned previously by the SIP outsourced request;

b) Remote edge router R2 161 installs QoS in remote Local Area Network (LAN) using SBM and informs R1 160, the LAN comprises at least one SIP client device;

c), R1 160 installs QoS in LAN using SBM;

d) LAN QoS reservation is confirmed end-to-end in one direction;

e) the same messages in steps (a)–(d) are repeated in the opposite direction;

f) Call progress is confirmed as "Ringing" and acknowledged back;

g) Two-way RTP (real-time transfer protocol) streaming is established; and h) The parties can say "hello" and have a phone conversation.

The sequence is now described in detail. With continued reference to FIG. 3, messages 23–31 establish call flow from caller to callee, while messages 32–40 establish call flow from the callee to the caller. Finally, messages 41–46 confirm the call progress and acknowledge the confirmation.

SIP client phone 115 initiates the request for network resources by sending an RSVP PATH message to edge router R1 160. RSVP PATH message is an operation sent by the sender to the receiver requesting a reservation. It follows the same route that the data flow of the reservation will follow. The request for resources is sent directly to edge router R1 160 rather than require edge router R1161 to request a policy decision from policy server POL1. In this manner, QoS is installed directly in R1 160 and decisions concerning policy are enforced per the local policy control. Recall that the specific policy for the flow was provisioned previously by the SIP outsourced request Edge router R1 160 forwards message 23 to remote edge router R2 161 as message 24. Edge router R2 161 installs QoS in the local area network LAN using the SBM by sending RSVP PATH message 25. The PATH message request resource reservation. GWY 136 informs edge router R1 160 of the installation by sending RSVP RESV message 26 to edge router R1 160. RSVP RESV messages reserves resources along the paths between each device. This message is forwarded to edge router R1 160 in the form of message 27. Router R1 160 then proceeds to install QoS in the LAN using the SBM by issuing RSVP RESV message 28. The LAN QoS reservation is then confirmed end-to-end in one direction using RSVP RESV-CONF messages 29, 30 and 31. Resource reservation for QoS is established in the reverse direction using the same message formats as in the forward direction. Specifically, messages 32–34 correspond to message 23, messages 35–37 correspond to message 26 and messages 38–40 correspond to message 29.

Finally, the call progress is confirmed as "Ringing" and the confirmation is acknowledged. To accomplish this, an SIP 200 OK message 41 is sent from GWY 136 to SIP2 152, modified and sent to SIP1 150 as message 42 and delivered to SIP client 115 as message 43. The acknowledgment is orchestrated by sending a SIP ACK message 44 from client 115 to SIP1 150. The message is modified and sent to SIP2 152 as message 45. Finally, an SIP ACK message 46 is sent from SIP2 152 to GWY 136.

Upon receipt of ACK message 46, two way RTP streaming is established and the parties can begin the phone conversation with QoS supported by resource reservation.

Figure 4:
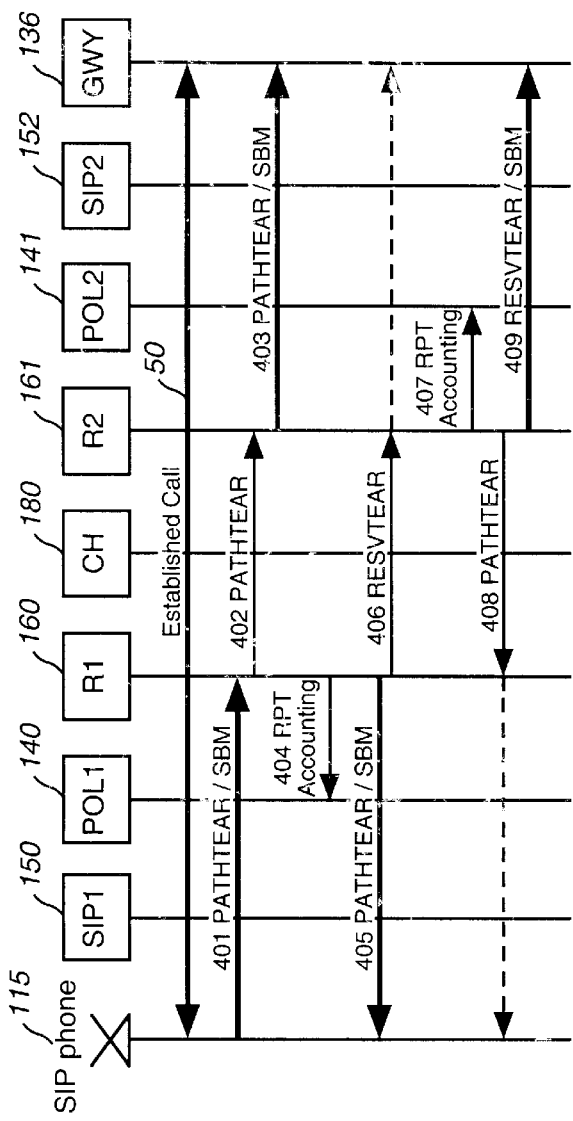
FIG. 4 is a call flow diagram illustrating an RSVP teardown signaling and release of QoS resources in accordance with the present invention.

Referring to FIG. 4, there is shown a call flow diagram illustrating RSVP teardown signaling and the release of QoS resources. After a call is setup and RSVP has been established, either user may signal RSVP to release the resources and teardown the QoS. While media traffic (phone call) can continue to traverse the network, it is no longer guaranteed resource reservation for QoS purposes. In general, the message exchange occurs as follows:

a) Client sends PATHTEAR message. PATHTEAR is propagated to remote gateway 136;

b) QoS is de-installed by edge router R1 160 in local LAN;

c) Local accounting report for removal of policy is provided by edge router R1 160 to policy server POL1, and this report is also used if real-time usage reporting is needed;

d) RSVP path teardown is signaled to remote gateway 136;

e) Remote accounting report is provided by edge router R2 162 to policy server POL2;

f) QoS resources are released in remote LAN; and g) Edge router R2 provides remote accounting report to policy server POL2.

The message exchange is described in detail in FIG. 4. The teardown is initiated when SIP client phone 115 sends an RSVP PATHTEAR message 401 to router R1 160. PATHTEAR messages request teardown of reserved resources. PATHTEAR message 401 is then propagated to remote router R2 161 as message 402 and terminates at gateway GWY 136 as message 403. The PATHTEAR message is sent by a sender toward a receiver and indicates that data flow is terminated. Router R1 160 then issues an accounting report message 404 to policy server POL1 140. At the same time, a PATHTEAR message 405 is generated and sent to SIP phone client 115, and a RESVTEAR message 406 is sent to router R2 161 and GWY 136. RESVTEAR messages actually remove reserved resources. Router R2 then issues an accounting report message 407 to policy server POL2 141. Finally, R2 issues a PATHTEAR message 408 to router R1 160 and SIP phone client 115, and issues a RESVTEAR message 409 to GWY 136. At the conclusion of the message exchange, RSVP is uninstalled and QoS resources are released. The call can continue, but it is no longer guaranteed resource reservation for QoS purposes.

Figure 5:
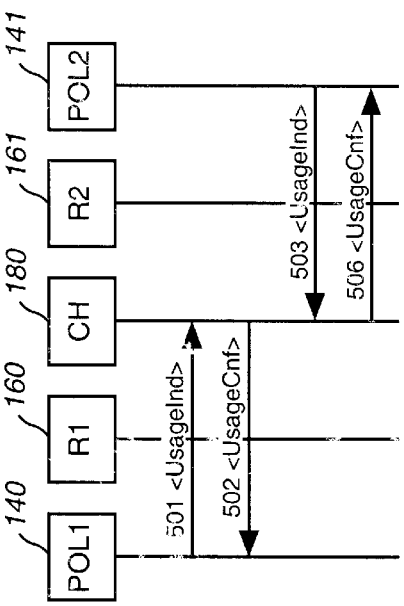
FIG. 5 is a call flow diagram illustrating a QoS usage reporting to a clearinghouse in accordance with the present invention.

Referring to FIG. 5, there is shown a call flow diagram illustrating a generic QoS usage reporting to a clearinghouse. Recall that as set forth above, clearing house server CH 180 has several functions including, among others, acting as a collector of usage reports, and acting as a means of settlement between service providers.

Usage by SIP client phone 115 is first reported by policy server POL1 140 to clearing house server CH 180 in message 501 and then confirmed in message 502. Remote usage is similarly reported by policy server POL2 141 to clearing house server CH 180 in message 503 and confirmed in message 506.

The generic teardown of resources for QoS and usage reporting shown above is typically linked to the termination of the Internet phone call. The more complex message exchanges are shown in FIG. 6 and FIG. 7.

Figure 6:
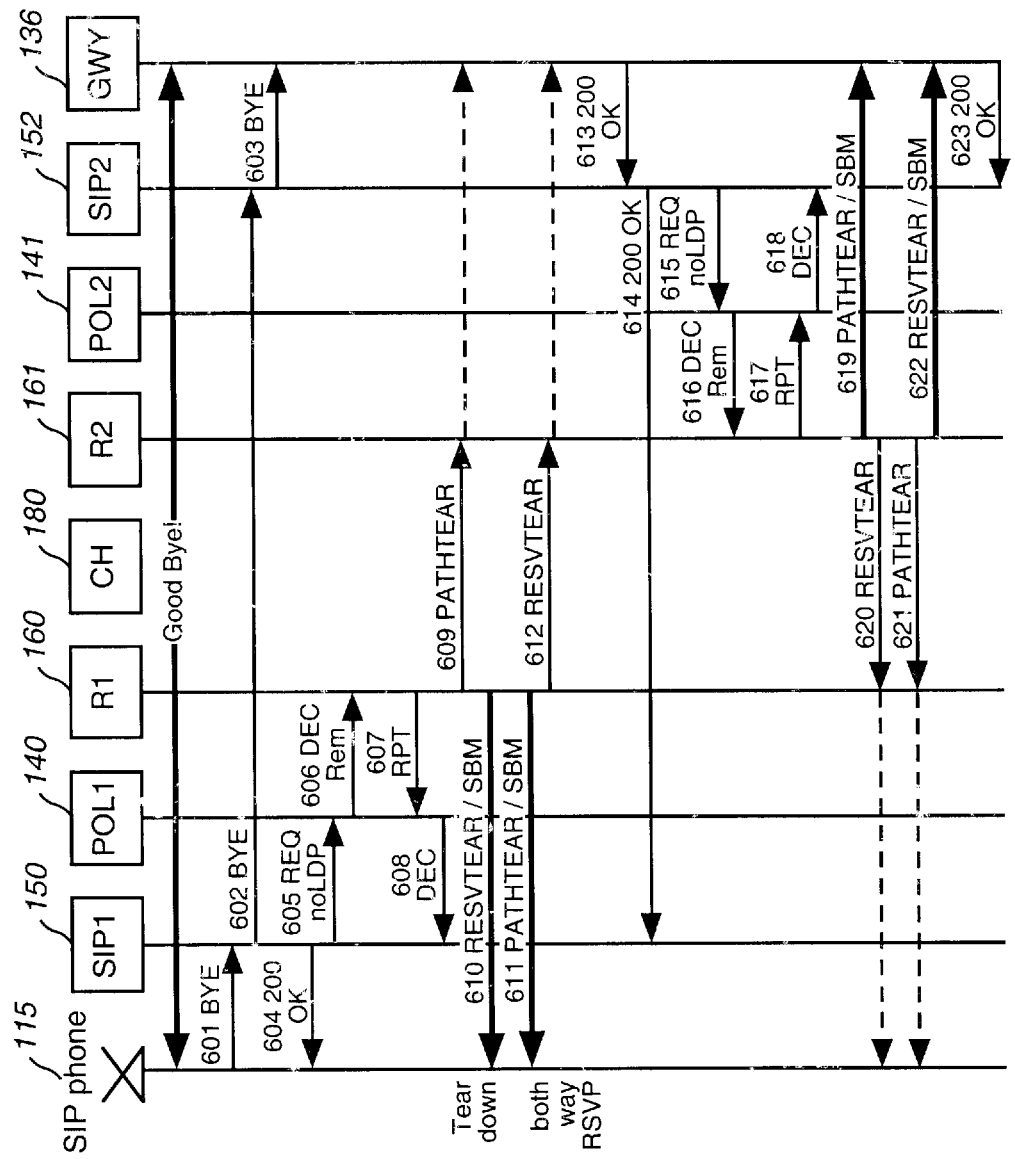
FIG. 6 is a call flow diagram illustrating a call teardown with background usage update in accordance with the present invention.
Figure 7:
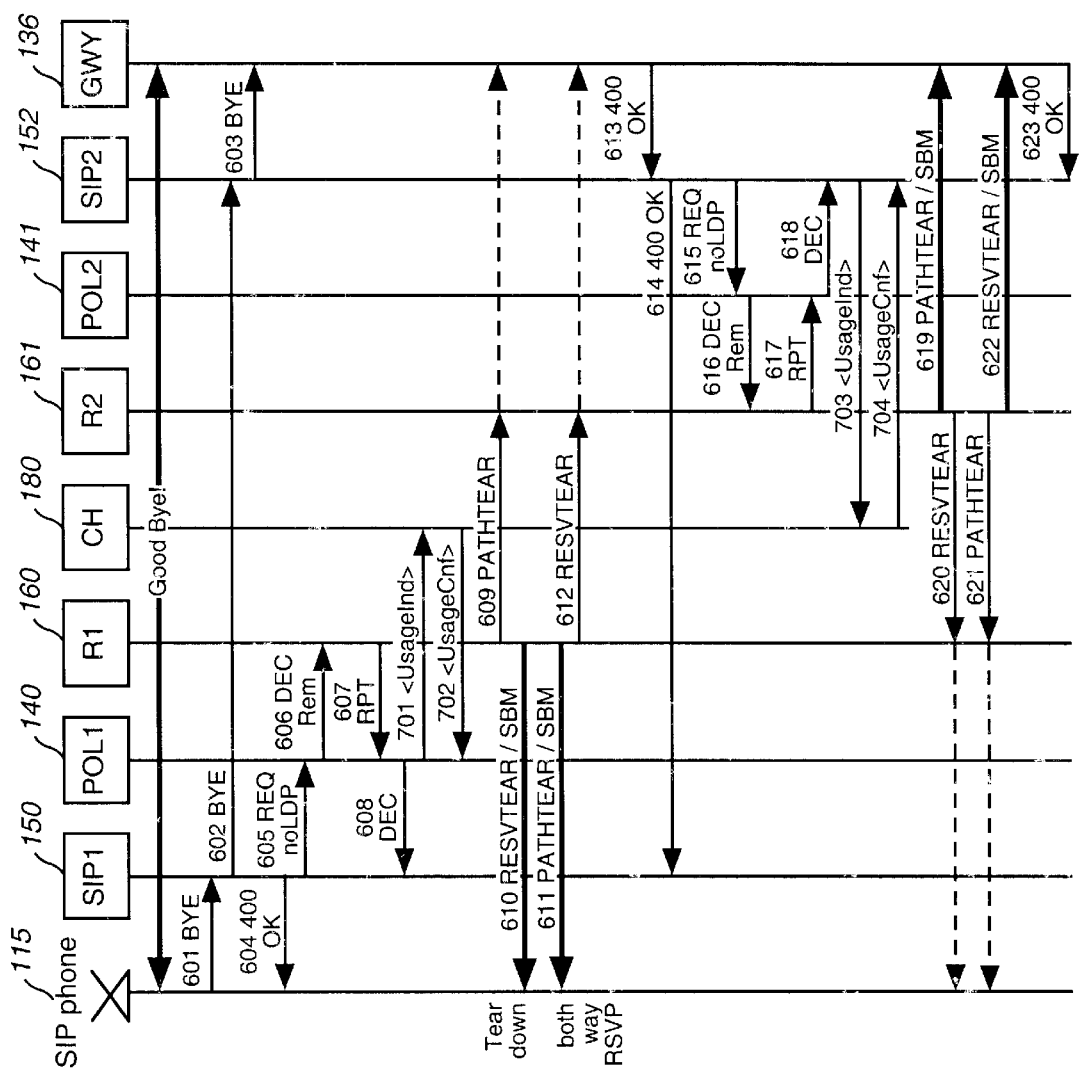
FIG. 7 is a call flow diagram illustrating a call teardown with real-time usage update in accordance with the present invention.

Referring to FIG. 6, there is shown a call flow diagram illustrating a call teardown with background usage update. Upon completion of the phone call, the users exchange parting words and hang up the phone. This event triggers the release of network resources and may initiate the generation of usage reports for subsequent billing. The usage reports can be generated either independent of the call and QoS teardown (FIG. 6) or contemporaneously with the call and QoS teardown (FIG. 7.) The latter option can support the instantaneous settlement of charges but adds OSP usage reporting messages to the teardown message exchange.

The call teardown is initiated when SIP client phone 115 sends a SIP BYE message 601 to SIP1 150. The message is propagated to GWY 136 in the forms of messages 602 and 603. SIP1 150 sends a 200 OK message 604 to SIP Client 115 confirming the BYE message 601. SIP1 150 then issues a COPS REQ noLDP (remove local decision policy) message 605 and removes the local decision policy from the LAN and router R1 160 with a COPS DEC Rem (COPS remove decision) message 606. A usage report RPT message 607 is generated and sent to policy server POL1. POL1 140 sends a COPS DEC message 608 to SIP1 150 and removes the policy from SIP1 150. RSVP path teardown is signaled to remote gateway 136 from router R1 160 using RSVP PATHTEAR message 609. Resources are released and path teardown is signaled using RSVP RESVTEAR message 610 and RSVP PATHTEAR message 611. Message 612 removes network resources and is similar to message 610. Messages 613 and 614 are a SIP 200 OK message indicating success and are sent from GWY 136 to SIP2 152 and forwarded to SIP1 150. Messages 615–622 accomplish the same tasks as messages 605–612 but occur at the remote router R2 161. Finally, SIP 200 OK message 23 indicates success. The report messages 607 and 617 are later used for billing to settle accounts.

Usage reporting may also happen in real time. Referring to FIG. 7, there is shown usage accounting in real time. The process is identical to FIG. 6 with the addition of steps 701 and 702 on the client side and steps 703 and 704 on the remote side. Message 701 is an OSP <Usage Indication> message and indicates message ID, duration and destination in addition to other parameters. Message 702 is an OSP <Usage Confirmation> message and confirms the information previously supplied.

Figure 8A:
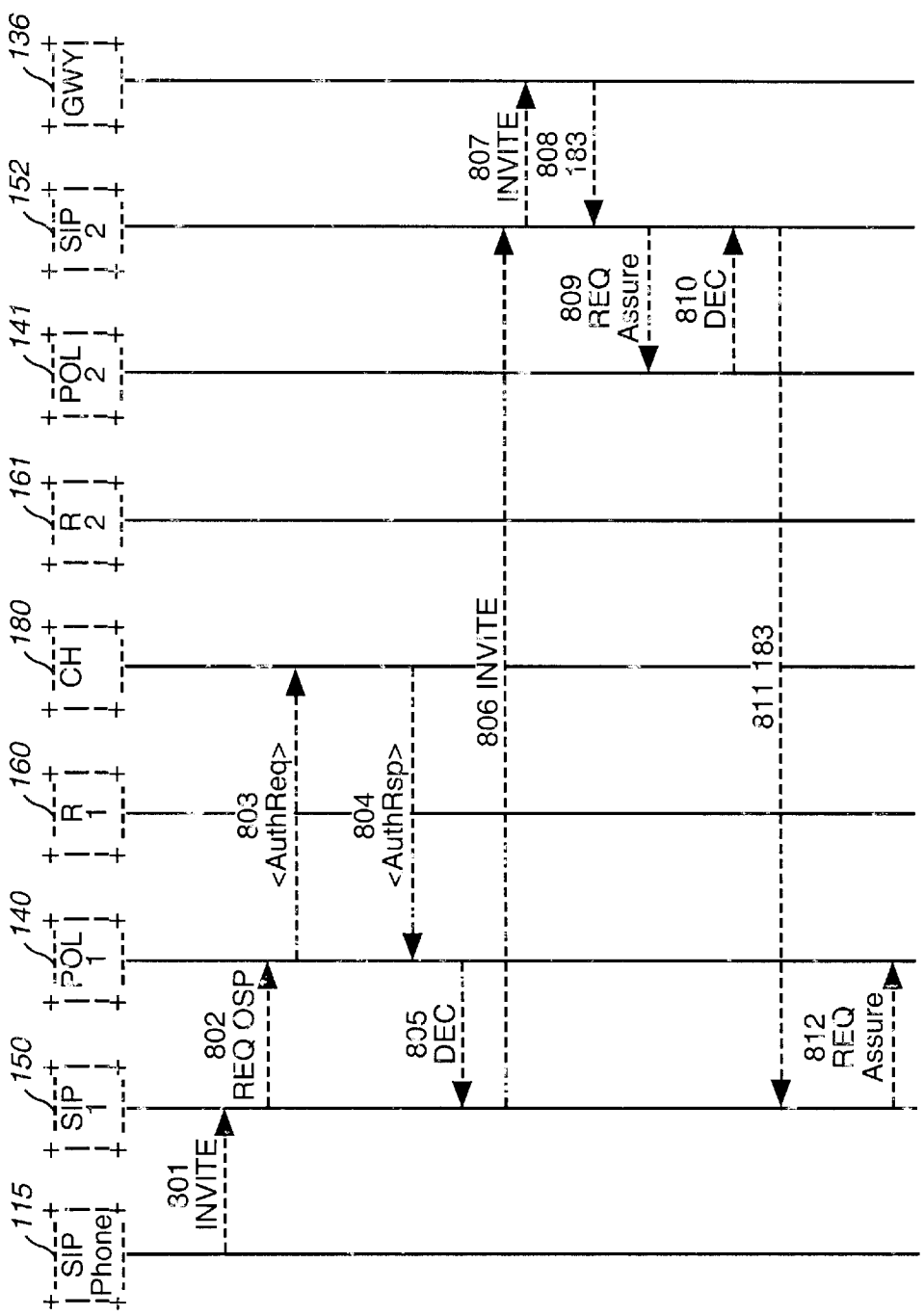
FIG. 8A is a call flow diagram illustrating a QoS assured call setup using a "PULL" model for implementing the local policy or QoS deployment in the network routers according to an embodiment of the present invention.

FIG. 8A illustrates a call flow diagram for a QoS assured call setup using a "PULL" model for implementing the local policy or QoS deployment in the network routers according to an embodiment of the present invention.

The assured QoS example represents an SIP initiated and controlled QoS policy. The integration of the QoS signaling with the SIP signaling by the application provides feedback during call setup on whether the media streams receive the requested QoS. The SIP application is able to react according to this feedback received during call setup. This integration also provides a mechanism for SIP to dynamically initiate policy control for the call by providing call specific data such as the media description to the policy server. This information is used by the policy server to administer the enforcement of media stream access to QoS. The information is also used later for SIP initiated RSVP state removal. After call establishment, the re-negotiation of QoS can be accomplished by following the same mechanism as used for call set-up.

The QoS assured "Pull" Model coordinates the implementation of QoS policy with the SIP signaling during the call setup. Initially, if clearinghouse 180 is used, the clearinghouse policy is determined for the call. SIP1 and SIP2 150, 152 then determine network access and feature information and dynamically relay the information to the policy servers 140, 141 in a COPS REQUEST assured message. Finally, the QoS resource policy is outsourced by the RSVP edge routers 160, 161 during the RSVP signaling phase using COPS.

The call sequence begins when SIP phone 115 initiates a session by sending an SIP INVITE message 801 to proxy server SIP1 150 and requests QoS. SIP1 150 then sends/outsources a COPS REQ OSP message 802 requesting AAA (authentication, authorization, and accounting) to a first/local policy server POL1 140. Upon receipt of message 802, local policy server POL1 140 sends an OSP authorization request <AUTHREQ> message 803 to clearing house server CH 180. Clearing house server CH 180 responds by sending an OSP Authorization response <AUTHRSP> message 804 back to POL1 140. AUTHRSP message 804 includes an authorization token for use with call setup.

POL1 140 next sends a COPS DEC (decision) install message 805 to SIP1 150 with the authorization token embedded in the message. SIP1 150 requests call setup with a second/remote SIP2 by generating an SIP INVITE message 806 requesting QoS and sending message 806 to SIP2 152. Upon receipt of INVITE message 806, SIP2 152 invites GWY 136 by sending an SIP INVITE message 807 that requests QoS. GWY 136 answers with an SIP 183 message 808 and echos that QoS is required. A SIP 183 message signifies session progress. SIP2 152 issues a COPS REQ assure message 809 to policy server 2 POL2 141. Message 809 also contains the authorization token. POL2 141 provisions policy for use by local policy control in SIP2 152 by sending a COPS DEC install message 810 to SIP2 152. When policy is provisioned in the remote end, SIP2 152 sends a SIP 183 message 811 to SIP1 150 which signifies a positive call progression on the remote end. Messages 812 and 813 are identical to messages 809 and 810. Finally, SIP1 150 informs SIP client phone 115 of the call progress by sending SIP 183 message 814.

Figure 8B:
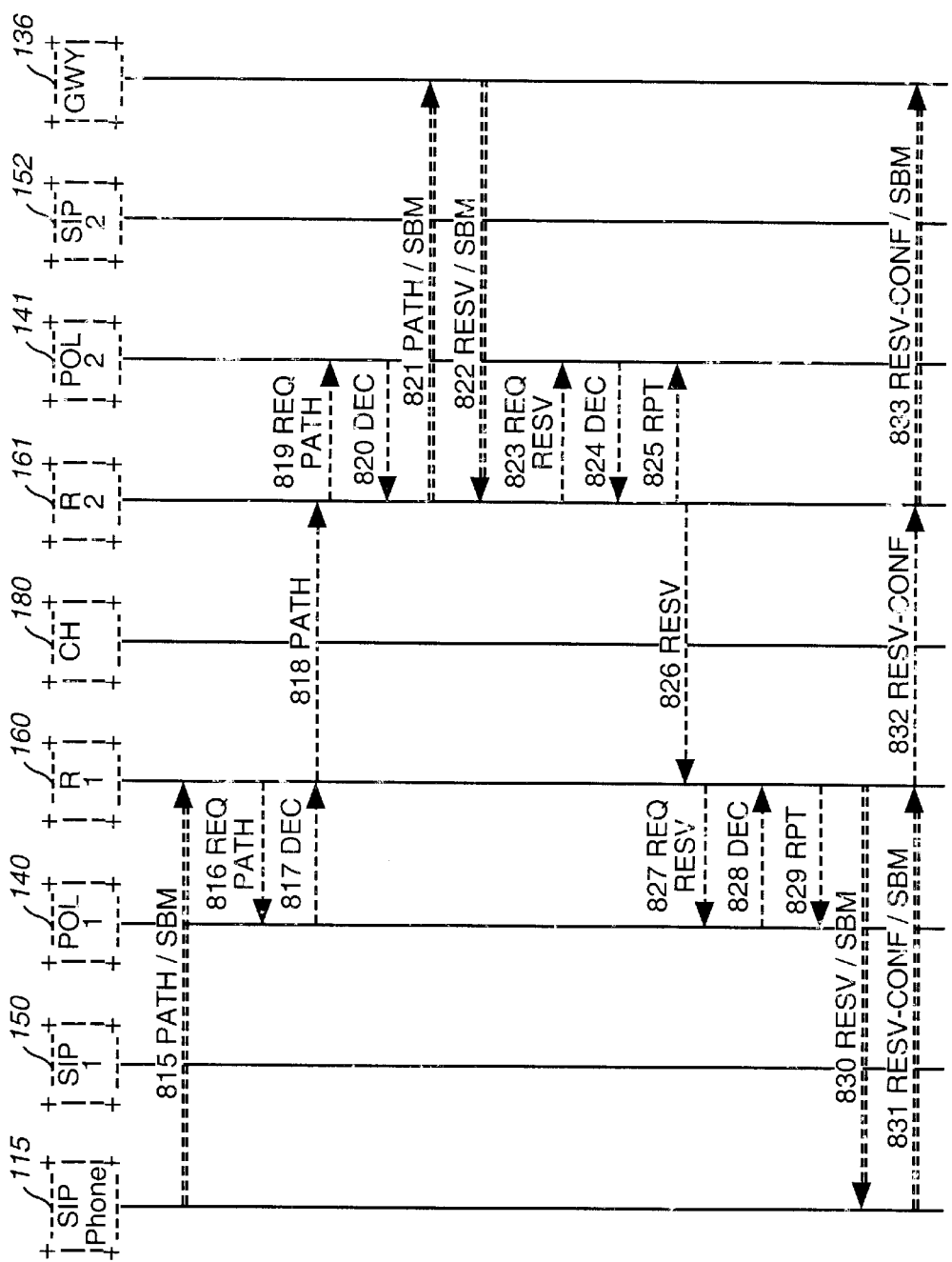
FIG. 8B is a continuation of the call flow diagram of FIG. 8A.

FIG. 8B is a continuation of the call flow of FIG. 8A. SIP Phone 115 sends a PATH/SBM message 815 to R1 160. R1 160 sends a REQ PATH message 816 to POL1 140. POL1 140 sends a DEC message 817 back to R1 160. A PATH message 818 is forwarded to R2 161. Messages 819 and 820 are similar to messages 816 and 817 and are preformed on the remote end. R2 next issues a PATh/SBM message 821 to GWY 136 and GWY 136 responds by sending a RESV/SBM message 822. Upon receipt of message 822, edge router R2 161 issues a REQ RESV message 823 to POL2 141. POL2 141 issues a DEC message 824 to R2 161. A report RPT message 825 is then sent to POL2 from R2. In addition, R2 161 sends a RESV message to R1 160. Messages 827–829 are identical to message 823–825 and are performed on the local end. After message 829 is sent from R1 to POL1, a RESV/SBM message 830 is sent from R1 160 to SIP phone 115. Finally, a RESV-CONF message is sent from SIP phone 115 to R1 160, and forwarded on to R2 161 and GWY 136 as messages 832 and 833. This sequence establishes resource reservation and assures QoS in the direction from the local end to the remote end.

Figure 9A:
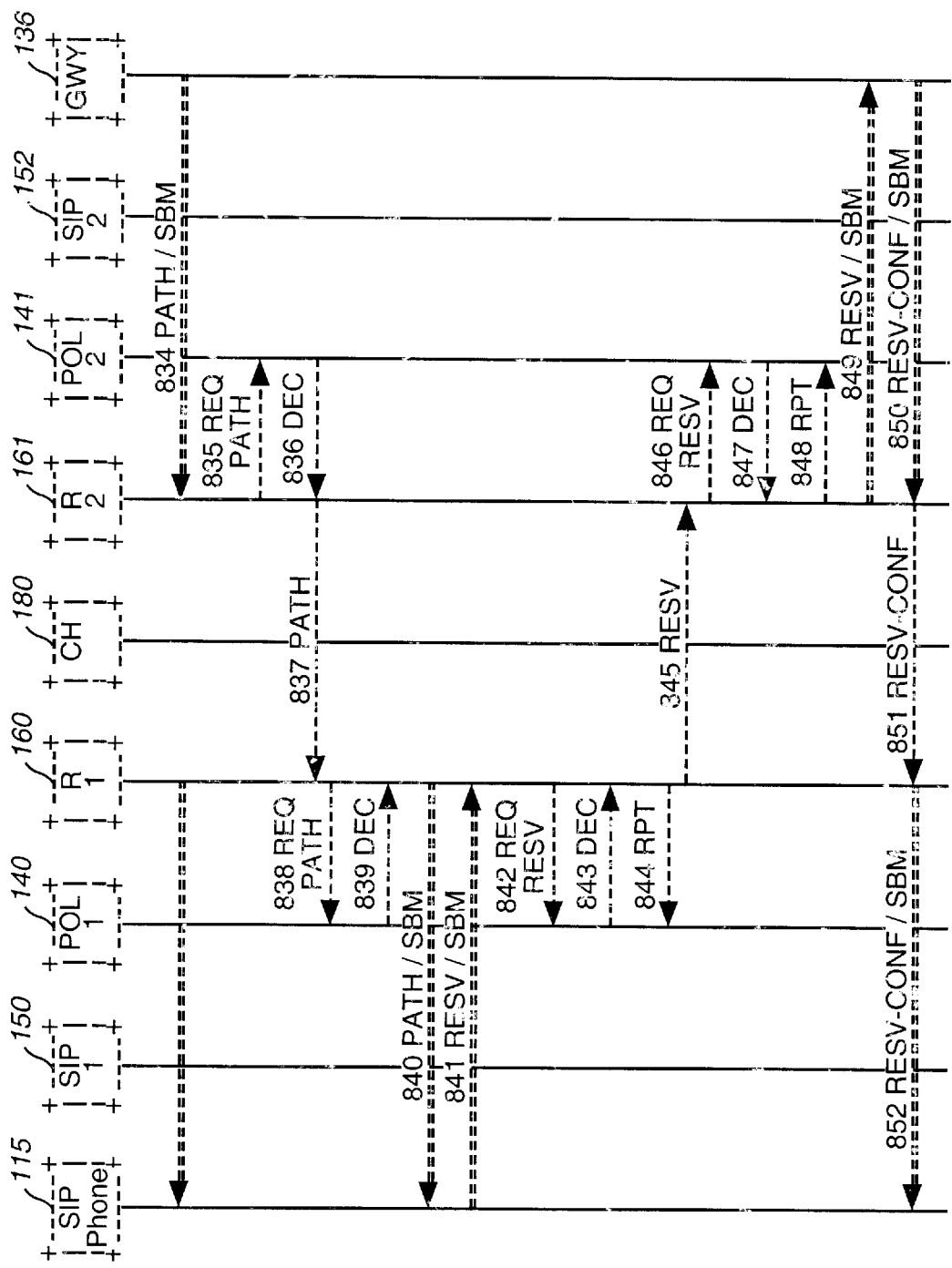
FIG. 9A is a call flow diagram illustrating a completion of a QoS assured call setup using a "PULL" model for implementing the local policy or QoS deployment in the network routers according to an embodiment of the present invention.

FIG. 9A is a call flow diagram illustrating the completion of a QoS assured call setup using a "PULL" model for implementing the local policy or QoS deployment in the network routers according to an embodiment of the present invention. Messages 834–852 perform the same steps as messages 815–833, respectively, but in the opposite direction, i.e. from the remote end to the local end.

Figure 9B:
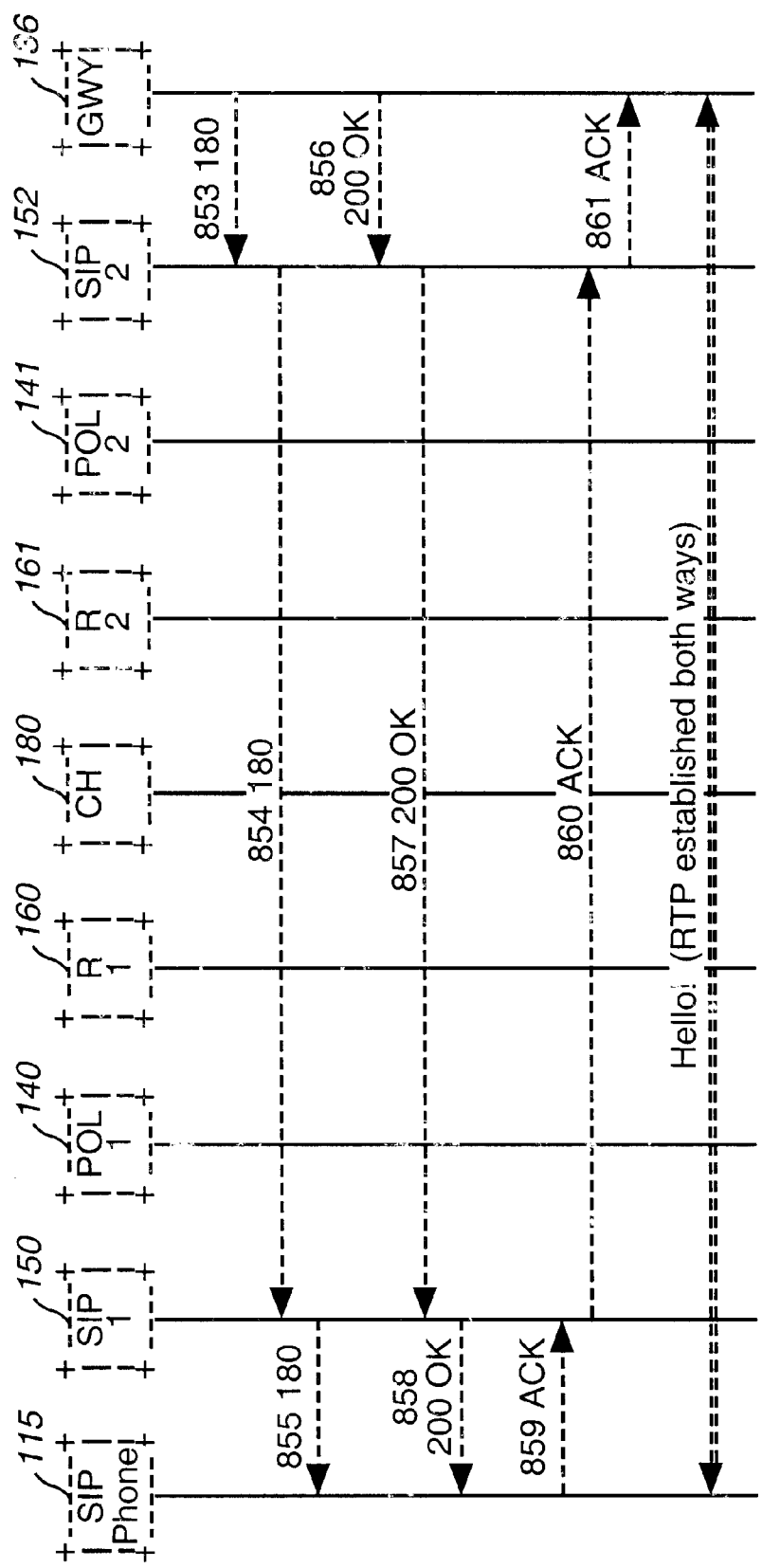
FIG. 9B is a continuation of the call flow diagram of FIG. 9A.

FIG. 9B illustrates the completion of the call sequences of FIGS. 8A, 8B, and 9A. GWY 136 signals the completion of the call setup using the "pull" method for provisioning QoS assured policy by sending a 180 message 853 to SIP2 152. SIP2 152 forwards the message to SIP1 150 as message 854. SIP1 150 then sends the 180 message from SIP2 to SIP Phone 115 as message 855. At the same time as 180 message 853 is sent, a 200 OK message is sent from GWY 136 to SIP Phone 115 as messages 856–858. When SIP Phone 115 receives the 200 OK message, it replies to GWY 136 with an ACK message 859–861. Real-time Transport Protocol (RTP) communication is now established in both directions. RTP is an IP protocol that supports real-time transmission of voice and video. An RFP packet includes time stamping and synchronization information in its header for proper reassembly at the receiving end.

Figure 10:
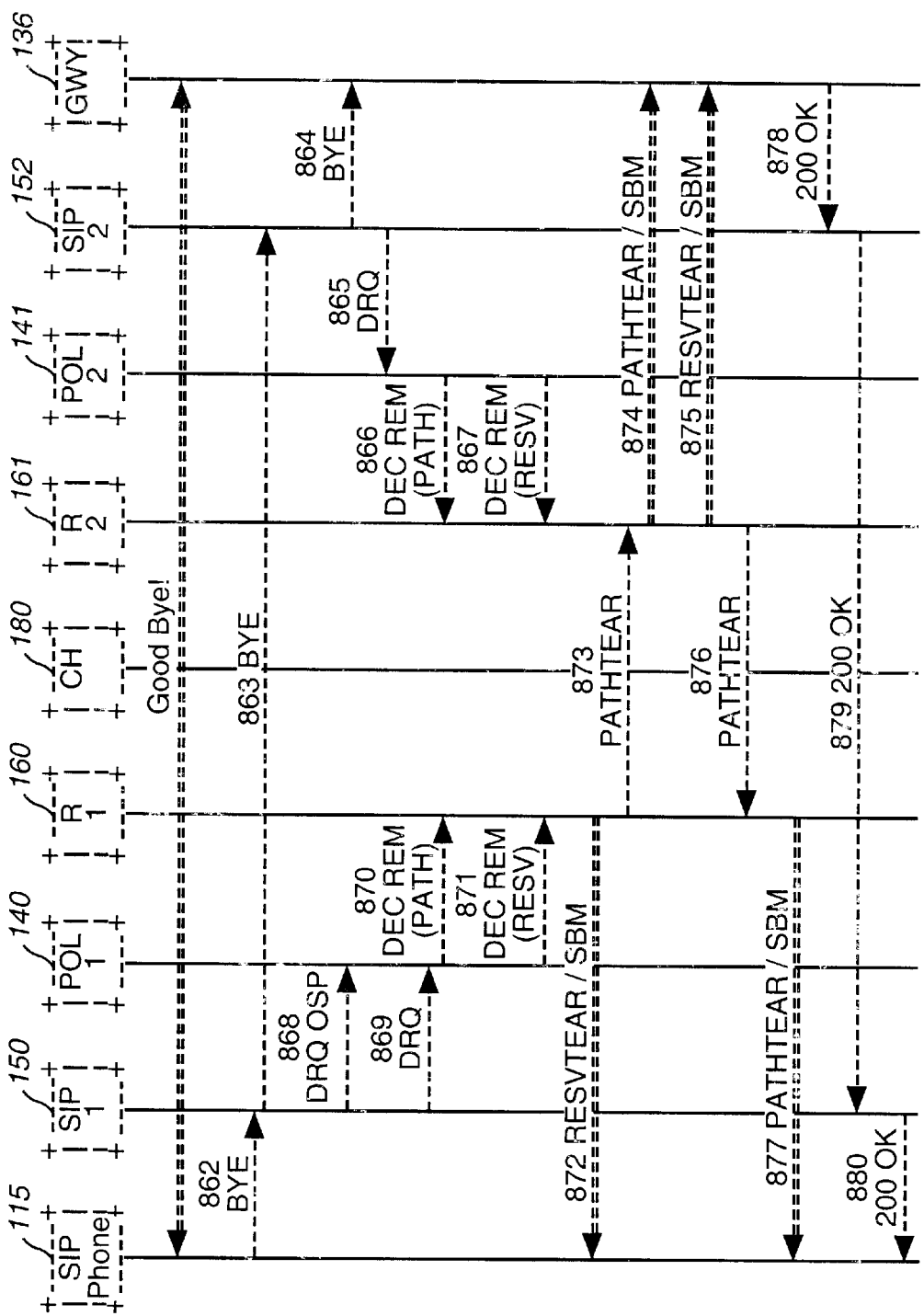
FIG. 10 is a call flow diagram illustrating a QoS assured call takedown using a "PULL" model for implementing the local policy or QoS deployment in the network routers according to an embodiment of the present invention.

FIG. 10 is a call flow diagram illustrating a QoS assured call takedown using a "PULL" model for implementing the local policy or QoS deployment in the network routers according to an embodiment of the present invention.

In the QoS assured session "Pull" model, session teardown is initiated by an SIP message and the removal of the associated RSVP flows is accomplished by the policy server issuing decisions to remove the installed Path and Resv state associated with the flow. The RSVP state that is removed is determined by the policy state information created based on the SIP initiated COPS REQUEST assured message.

The teardown of the call is initiated by an SIP BYE message 862 issued by SIP Phone 115 to SIP1 150. The message is sent to SIP2 152 as message 863 and arrives at GWY 136 as message 864. At this point, SIP2 152 issues a DRQ message 865 to POL2 141. POL2 141 issues a DEC REM (PATH) message 866 and a DEC REM (RESV) message 867 to R2 161.

When SIP 1 150 sends message 863 to SIP2, SIP1 also sends a DRQ OSP message 868 and a DRQ message 869 to POL1 140. POL1 issues a DEC REM (PATH) message 870 and a DEC REM (RESV) message 871 to R1 160 in the same manner as is performed on the remote end. When R1 receives the 871 message, R1 issues a RESVTEAR/SBM message 872 to SIP Phone 115 and a PATHTEAR message 873 to R2. Upon receipt of the PATHTEAR message 873, R2 sends a PATHTEAR/SBM message 874 and a RESVTEAR/SBM message 875 to GWY 136. A RESVTEAR message 876 is then sent from R2 to R1. The RESVTEAR message 876 triggers a PATHTEAR/SBM message 877 from R1 to SIP Phone 115. The call sequence teardown is completed when a 200 OK message is sent from GWY 136 to SIP Phone 115 as messages 878–880.

Figure 11A:
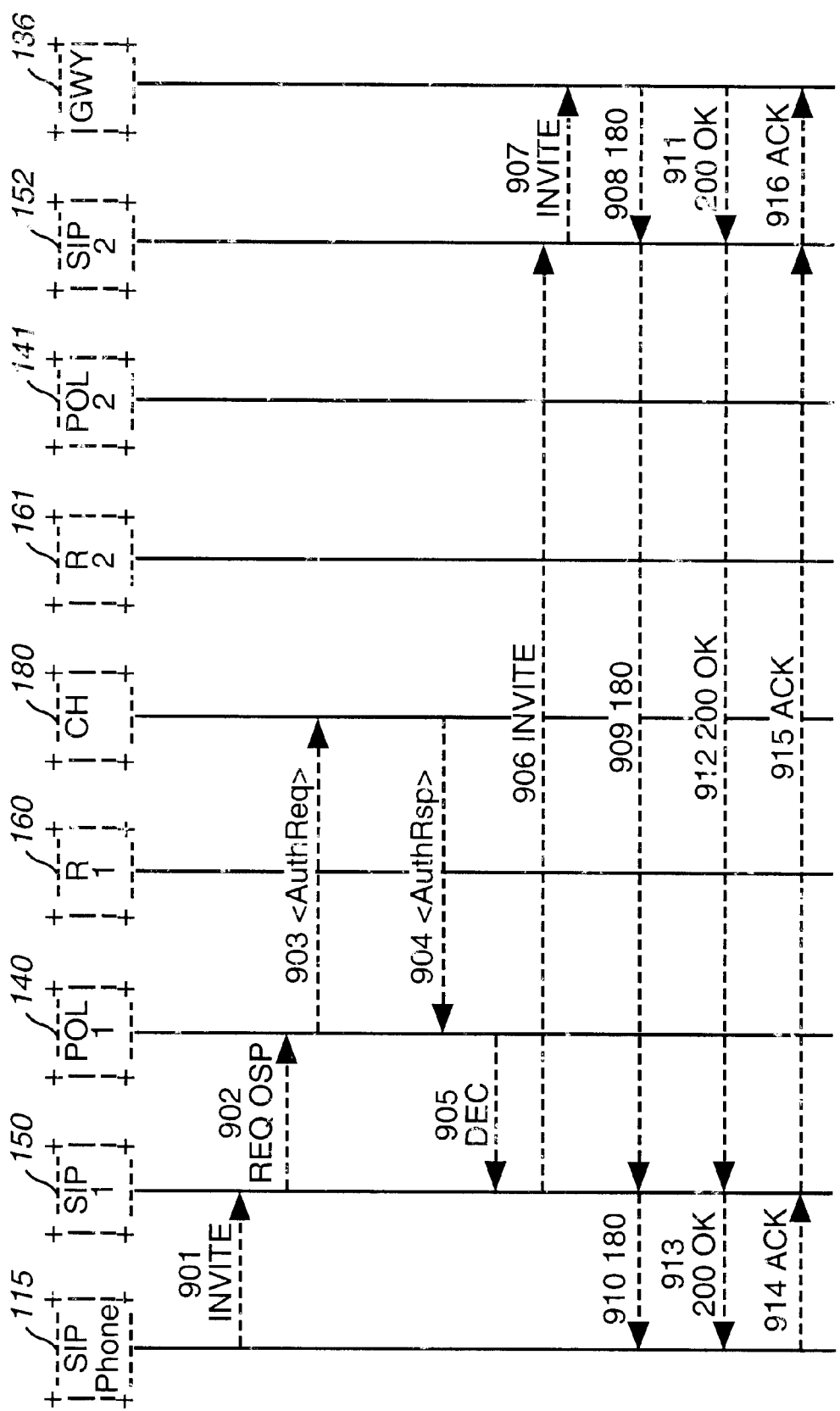
FIG. 11A is a call flow diagram illustrating a QoS enabled call setup using a "PULL" model for implementing the local policy or QoS deployment in the network routers according to an embodiment of the present invention.

FIG. 11A illustrates a call flow diagram of a QoS enabled call setup using a "PULL" model for implementing the local policy or QoS deployment in the network routers according to an embodiment of the present invention.

In the QoS Enabled Model, the QoS is determined independently from SIP session establishment. The SIP session is not delayed to ascertain the QoS for the call. The QoS request is evaluated after establishment of the SIP session. There is no sharing of session information between SIP and RSVP protocols. The QoS is controlled by information contained in the RSVP signaled and the pre-provisioned policy rules. There is no additional delay in call setup is introduced by the model as experienced with the QoS Assured Model. However, the initial moments of the session may experience best effort side-effects such as voice clipping until the RSVP signaling is completed or that QoS is established at all for the call.

Figure 11B:
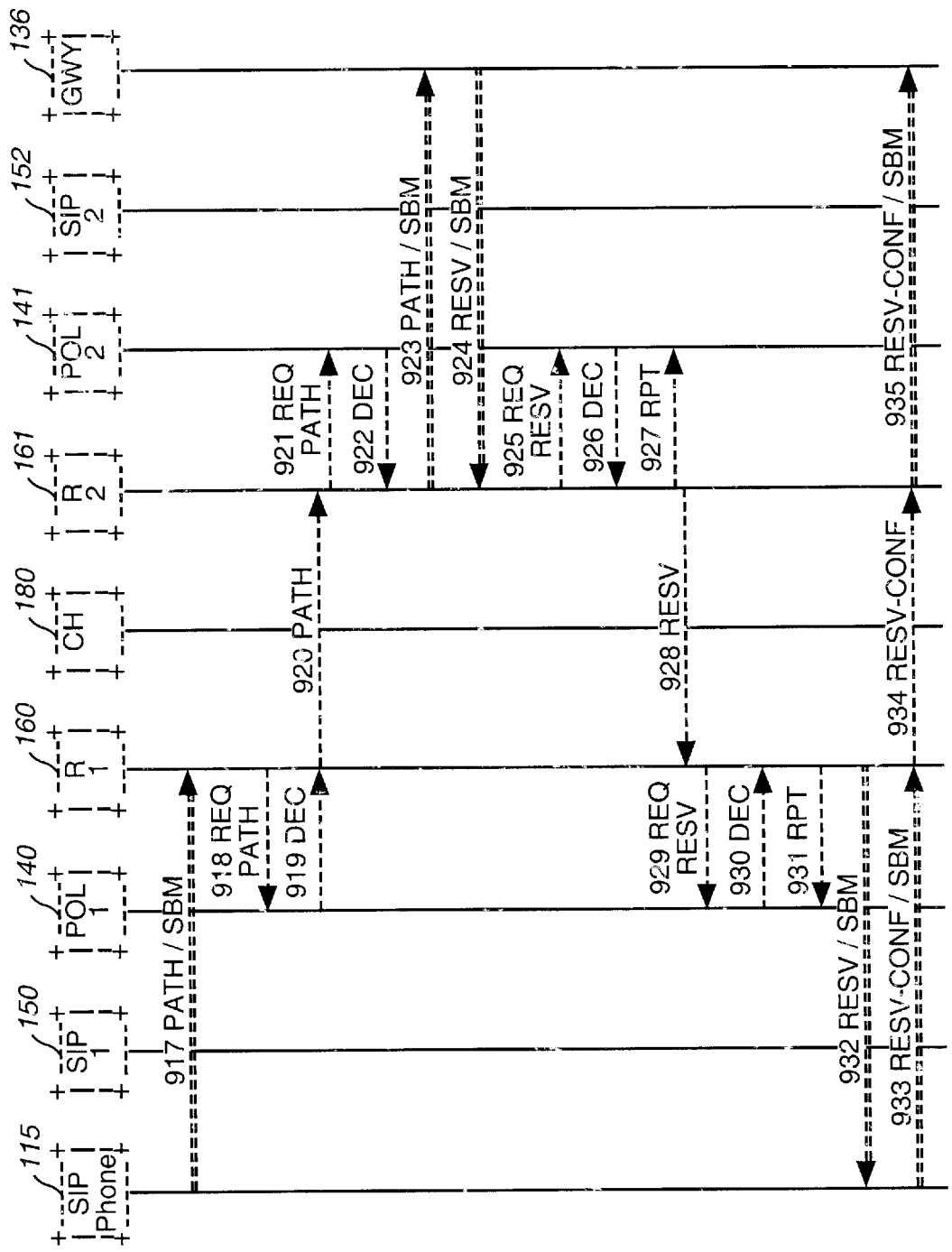
FIG. 11B is a continuation of the call flow diagram of FIG. 11A.
Figure 12:
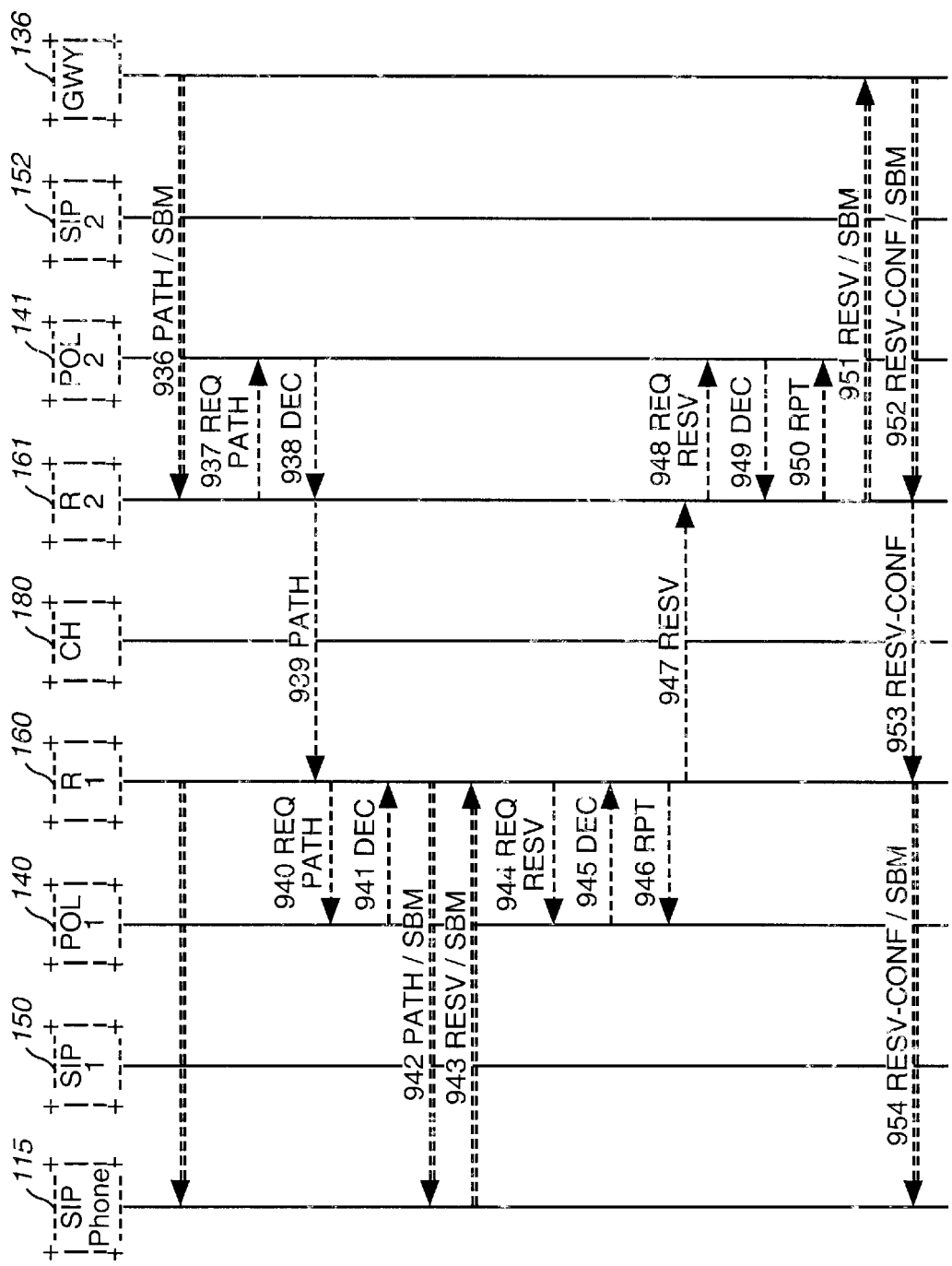
FIG. 12 is a call flow diagram illustrating a completion of a QoS enabled call setup using a "PULL" model for implementing the local policy or QoS deployment in the network routers according to an embodiment of the present invention.

Since the QoS is determined independently from SIP session establishment, the call setup is simplified as compared to the assured model. Call setup includes messages 901 to 907 which are the same as steps 801 to 807 of FIG. 8A and messages 908 to 916 which are the same as messages 853 to 861 of FIG. 9B. After the call is setup, QoS is installed in the same manner as in the assured model. Specifically, messages 917 to 954 of FIGS. 11B and 12 correspond to messages 815 to 852 of FIGS. 8B and 9A.

Figure 13:
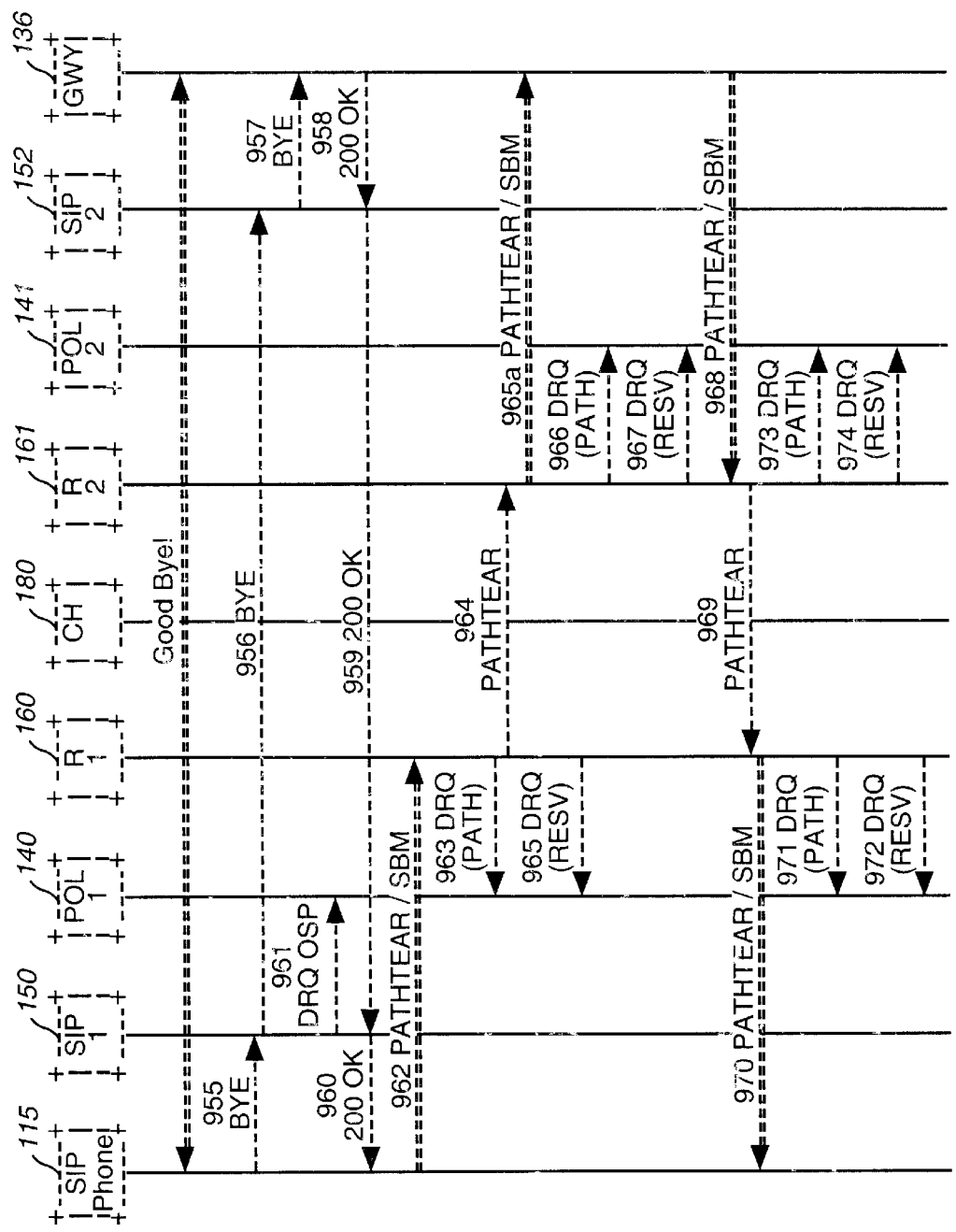
FIG. 13 is a call flow diagram illustrating a QoS enabled call takedown using a "PULL" model for implementing the local policy or QoS deployment in the network routers according to an embodiment of the present invention.

FIG. 13 is a call flow diagram illustrating a QoS enabled call takedown using a "PULL" model for implementing the local policy or QoS deployment in the network routers according to an embodiment of the present invention.

Similar to the QoS assured session teardown, QoS removal is signaled by either SIP or RSVP mechanisms. Unlike the QoS assured model, there is no interdependency between SIP session removal and RSVP flow removal. The removal of QoS for media stream is handled independently from the SIP session.

Teardown of the QoS enabled "pull" method call is initiated by an SIP BYE message 955 issued from SIP Phone 115 to SIP1 150. The message is forwarded to SIP2 and then on to GWY 136 as messages 956 and 957 respectively. GWY 136 responds by sending a 200 OK message 958 to SIP2. SIP2 forwards the message to SIP1 and then on to SIP Phone 115 as messages 959 and 960 respectively. SIP1 150 also sends a DRQ OSP message 961 to POL1.

A PATHTEAR/SBM message 962 is sent from SIP Phone 115 to R1 160. The message is relayed to R2 as message 964. A PATHTEAR/SBM message 965a is also sent from R2 to GWY 136. A DRQ(path) message 963 and a DRQ(resv) message 965 are sent from R1 to POL1, and similar messages 966 and 967 are sent from R2 to POL2. Upon receipt of PATHTEAR/SBM message 965a, a PATHTEAR/SBM message 968 is sent from GWY 136 to R2. R2 sends a PATHTEAR message 969 to R1 and R1 sends a PATHTEAR/SBM message 970 to SIP Phone 115. At this point, a DRQ(path) message 971 and a DRQ(resv) message 972 are sent from R1 to POL1, and similar messages 973 and 974 are sent from R2 to POL2. The call has now been taken down and the resources have been released for use with other calls.

While several embodiments of the present invention have been shown and described, it is to be understood that many changes and modifications may be made thereto without departing from the spirit and scope of the invention as defined in the appended claims.

What is claimed is:

1. A method of providing quality of service (QoS) in an Internet Protocol (IP) telephony session between a calling party and a called party, comprising the steps of:

providing transporting IP media for said session between said calling party and a first device having IP capability;

providing transporting IP media for said session between said called party and a second device having IP capability;

establishing an IP connection between said first device and said second device; and reserving network resources for said telephony session;

generating a first session initiation protocol (SIP) call setup request with QoS by an SIP client;

transporting said first call setup request to a first SIP proxy server;

generating a second SIP call setup request with QoS by said first SIP proxy server to a second SIP proxy server;

generating a third SIP call setup request with QoS by said second SIP proxy server to a remote client;

provisioning policy in said second device and said second SIP proxy server;

provisioning policy in said first device and said first SIP proxy server upon successful provisioning of policy in said second device and said second SIP proxy server; and notifying said SIP client of the call progress.

2. The method according to claim 1, wherein said first and said second devices are routers.

3. The method according to claim 1, wherein the step of reserving network resources uses Resource Reservation Protocol (RSVP).

4. The method according to claim 1, further comprising the steps of:

provisioning policy by a remote policy server in said second device and said second SIP proxy server;

provisioning policy by a client policy server in said first device and said first SIP proxy server upon successful provisioning of policy in said second device and said second SIP proxy server.

5. The method according to claim 1, further comprising the steps of:

installing QoS in a remote local area network (LAN) using a remote subnet bandwidth manager (SBM) and said second device;

informing said first device of said QoS installation in said remote LAN;

installing QoS in a client LAN using a client SBM and said first device;

confirming and acknowledging the call progress; and establishing real-time transfer protocol (RTP) streaming.

6. The method according to claim 5, further comprising the steps of:

propagating an RSVP PATHTEAR message to a remote gateway to request removal of QoS in the client LAN;

uninstalling QoS in client LAN u sing said first device;

propagating an RSVP RESVTEAR message to said remote gateway to request removal of QoS in the remote LAN; and uninstalling QoS in remote LAN using said second device.

7. The method according to claim 6, further comprising the steps of:

generating a first usage report by said first device to a first policy server; and generating a second usage report by said second device to a second policy server, wherein the usage reports are used for accounting purposes.

8. The method according to claim 1, further comprising the steps of:

checking a first policy server to determine correct policy, wherein said checking is performed by said first SIP server;

checking a clearing house server to determine correct policy and to request authorization for the policy, wherein said checking and requesting is performed by said first policy server;

notifying said first policy server of the correct policy and providing authorization for the policy;

checking a second policy server to determine correct policy, wherein said checking is performed by said second SIP server;

checking said clearing house server to determine correct policy and to request authorization for the policy, wherein said checking and requesting is performed by said second policy server; and notifying said second policy server of the correct policy and providing authorization for the policy.

9. A method for un-installing quality of service (QoS) policy in a network for an IP telephone call between a calling terminal and a called terminal comprising the steps of:

sending an SIP BYE message from the calling terminal to a first SIP server;

sending said SIP BYE message from said first SIP server to a second SIP server;

sending said SIP BYE message from said second SIP server to the called terminal;

uninstalling the QoS policy in a first edge router;

uninstalling the QoS policy in a second edge router; and sending an OK message from the called terminal to the calling terminal indicating the completion of the un-installation of QoS from the network.

* * * * *

UNITED STATES PATENT AND TRADEMARK OFFICE
CERTIFICATE OF CORRECTION

PATENT NO. : 6,366,577 B1
DATED : April 2, 2002
INVENTOR(S) : Steven R. Donovan

It is certified that error appears in the above-identified patent and that said Letters Patent is hereby corrected as shown below:

Title page,
"Item [60], Provisional application No. 60/163,193, filed on Nov. 2, 1999." should read, -- Item [60], Provisional application No. 60/163,913, filed on Nov. 2, 1999. --;

Column 1,
Line 11, "of U.S. Provisional application Ser. No. 60/163,193" should read -- of U.S. Provisional application Ser. No. 60/163,913 -- therefor.

Signed and Sealed this

Sixteenth Day of July, 2002

*Attest:*

*Attesting Officer*

JAMES E. ROGAN
*Director of the United States Patent and Trademark Office*

UNITED STATES PATENT AND TRADEMARK OFFICE
Certificate

Patent No. 6,366,577 B1                                                  Patented: April 2, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Steven R. Donovan, Plano, TX (US); John K. Gallant, Plano, TX (US); and Diana Rawlins, Richardson, TX (US).

Signed and Sealed this Thirtieth Day of May 2006.

HASSAN KIZOU
*Supervisory Patent Examiner*
Art Unit 2616